(12) United States Patent
Bright et al.

(10) Patent No.: US 8,955,097 B2
(45) Date of Patent: Feb. 10, 2015

(54) TIMING MANAGEMENT IN A LARGE FIREWALL CLUSTER

(75) Inventors: David Andrew Bright, Lino Lakes, MN (US); Michael James Silbersack, Little Canada, MN (US); Aaron Christopher Bucher, Minneapolis, MN (US)

(73) Assignee: McAfee, Inc., Santa Clara, CA (US)

( * ) Notice: Subject to any disclaimer, the term of this patent is extended or adjusted under 35 U.S.C. 154(b) by 189 days.

(21) Appl. No.: 13/324,990

(22) Filed: Dec. 13, 2011

(65) Prior Publication Data

US 2013/0152191 A1 Jun. 13, 2013

(51) Int. Cl.
*G06F 9/00* (2006.01)
(52) U.S. Cl.
USPC .................................. 726/14; 726/11; 726/3
(58) Field of Classification Search
CPC ...... H04L 63/20; H04L 63/0263; H04L 63/02
See application file for complete search history.

(56) References Cited

U.S. PATENT DOCUMENTS

| | | | | |
|---|---|---|---|---|
| 5,444,694 | A * | 8/1995 | Millet et al. | 370/224 |
| 6,449,734 | B1 * | 9/2002 | Shrivastava et al. | 714/15 |
| 7,039,694 | B2 * | 5/2006 | Kampe et al. | 709/222 |
| 7,461,130 | B1 * | 12/2008 | AbdelAziz et al. | 709/208 |
| 7,483,374 | B2 * | 1/2009 | Nilakantan et al. | 370/235 |
| 7,519,008 | B2 * | 4/2009 | McDermott et al. | 370/254 |
| 7,730,180 | B1 * | 6/2010 | Krishnan et al. | 709/224 |
| 7,978,631 | B1 * | 7/2011 | Abdelaziz et al. | 370/255 |
| 8,090,880 | B2 * | 1/2012 | Hasha et al. | 709/251 |
| 2001/0032324 | A1 * | 10/2001 | Slaughter et al. | 714/4 |
| 2003/0041138 | A1 * | 2/2003 | Kampe et al. | 709/223 |
| 2003/0163780 | A1 * | 8/2003 | Kossa | 715/500 |
| 2003/0204273 | A1 * | 10/2003 | Dinker et al. | 700/48 |
| 2004/0071469 | A1 * | 4/2004 | Baldine et al. | 398/79 |
| 2005/0005200 | A1 * | 1/2005 | Matena et al. | 714/38 |
| 2005/0055418 | A1 * | 3/2005 | Blanc et al. | 709/209 |
| 2005/0138517 | A1 * | 6/2005 | Monitzer | 714/746 |
| 2005/0185646 | A1 | 8/2005 | Karino et al. | |
| 2006/0053216 | A1 * | 3/2006 | Deokar et al. | 709/223 |
| 2006/0153156 | A1 * | 7/2006 | Wentink et al. | 370/338 |
| 2008/0098113 | A1 * | 4/2008 | Hansen et al. | 709/226 |

(Continued)

FOREIGN PATENT DOCUMENTS

| | | |
|---|---|---|
| JP | 2008-547299 A | 12/2008 |
| JP | 2010-050939 A | 3/2010 |
| JP | 4619943 B2 | 1/2011 |

OTHER PUBLICATIONS

International Search Report and Written Opinion for PCT Application No. PCT/US2012/063255, mailed on Feb. 27, 2013, 11 pages.

*Primary Examiner* — Jeffrey Pwu
*Assistant Examiner* — Carlos Amorin
(74) *Attorney, Agent, or Firm* — Wong, Cabello, Lutsch, Rutherford & Brucculeri, LLP

(57) ABSTRACT

A firewall cluster comprises three or more firewall processing nodes, which report primary node status based on the reporting node's membership in a preexisting cluster. A controller uses the reported status to assign a primary node in the distributed firewall cluster. Reported primary node status includes reported primary node eligibility if the node is a member of a preexisting cluster, reported primary node status comprising reporting primary node ineligibility if the node is not a member of a preexisting cluster, reported primary node status if the node is a primary node in a preexisting cluster, and reported primary node eligibility in a node that has timed out.

25 Claims, 3 Drawing Sheets

(56) References Cited

U.S. PATENT DOCUMENTS

| | | | |
|---|---|---|---|
| 2008/0115140 A1* | 5/2008 | Erva et al. | 718/104 |
| 2008/0275975 A1* | 11/2008 | Pandey et al. | 709/223 |
| 2008/0281938 A1* | 11/2008 | Rai et al. | 709/209 |
| 2009/0097406 A1* | 4/2009 | Nilakantan et al. | 370/235 |
| 2009/0182877 A1* | 7/2009 | Mcdermott et al. | 709/225 |
| 2010/0076783 A1* | 3/2010 | Mathur | 705/2 |
| 2010/0103781 A1* | 4/2010 | Rai et al. | 368/55 |
| 2011/0010584 A1* | 1/2011 | Kochar et al. | 714/32 |
| 2011/0023104 A1* | 1/2011 | Franklin | 726/11 |
| 2011/0072206 A1* | 3/2011 | Ross et al. | 711/108 |
| 2011/0238842 A1* | 9/2011 | Massa et al. | 709/226 |
| 2011/0320065 A1* | 12/2011 | Ying | 701/1 |
| 2012/0101991 A1* | 4/2012 | Srivas et al. | 707/623 |
| 2012/0110651 A1* | 5/2012 | Van Biljon et al. | 726/4 |
| 2012/0151503 A1* | 6/2012 | Clarke | 719/318 |
| 2012/0166390 A1* | 6/2012 | Merriman et al. | 707/613 |
| 2012/0167162 A1* | 6/2012 | Raleigh et al. | 726/1 |
| 2012/0179798 A1* | 7/2012 | Pafumi et al. | 709/223 |
| 2012/0185553 A1* | 7/2012 | Nelson | 709/209 |
| 2012/0209821 A1* | 8/2012 | Fried et al. | 707/697 |
| 2012/0284770 A1* | 11/2012 | Bartholomy et al. | 726/1 |
| 2013/0054966 A1* | 2/2013 | Clay | 713/168 |

* cited by examiner

TIMING MANAGEMENT IN A LARGE FIREWALL CLUSTER

FIELD OF THE INVENTION

The invention relates generally to firewall operation, and more specifically in one embodiment to timing management in a large firewall cluster.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

BACKGROUND

Computers are valuable tools in large part for their ability to communicate with other computer systems and retrieve information over computer networks. Networks typically comprise an interconnected group of computers, linked by wire, fiber optic, radio, or other data transmission means, to provide the computers with the ability to transfer information from computer to computer. The Internet is perhaps the best-known computer network, and enables millions of people to access millions of other computers such as by viewing web pages, sending e-mail, or by performing other computer-to-computer communication.

But, because the size of the Internet is so large and Internet users are so diverse in their interests, it is not uncommon for malicious users or pranksters to attempt to communicate with other users' computers in a manner that poses a danger to the other users. For example, a hacker may attempt to log in to a corporate computer to steal, delete, or change information. Computer viruses or Trojan horse programs may be distributed to other computers, or unknowingly downloaded or executed by large numbers of computer users. Further, computer users within an organization such as a corporation may on occasion attempt to perform unauthorized network communications, such as running file sharing programs or transmitting corporate secrets from within the corporation's network to the Internet.

For these and other reasons, many corporations, institutions, and even home users use a network firewall or similar device between their local network and the Internet. The firewall is typically a computerized network device that inspects network traffic that passes through it, permitting passage of desired network traffic based on a set of rules.

Firewalls perform their filtering functions by observing communication packets, such as TCP/IP or other network protocol packets, and examining characteristics such as the source and destination network addresses, what ports are being used, and the state or history of the connection. Some firewalls also examine packets traveling to or from a particular application, or act as a proxy device by processing and forwarding selected network requests between a protected user and external networked computers.

The firewall typically controls the flow of network information by monitoring connections between various ports, sockets, and protocols, such as by examining the network traffic in a firewall. Rules based on socket, port, application, and other information are used to selectively filter or pass data, and to log network activity. Firewall rules are typically configured to identify certain types of network traffic that are to be prohibited or that should have certain other restrictions applied, such as blocking traffic on ports known to be used for file sharing programs while virus scanning any received over a traditional FTP port, blocking certain applications or users from performing some tasks while allowing others to perform such tasks, and blocking traffic based on known attack patterns such as repeated queries to different ports from a common IP address. Firewalls can also be configured to permit certain types of traffic, such as to allow encrypted traffic so that a remote system can communicate with a VPN or Virtual Private Network behind the firewall.

But, the ability of a firewall to manage such connections when distributed across multiple computer systems is limited in that the various nodes must be able to work together to implement a firewall. Improved firewall distribution in a cluster is therefore desired.

SUMMARY

In one example embodiment, a firewall cluster comprises three or more firewall processing nodes, which report primary node status based on the reporting node's membership in a preexisting cluster. A controller uses the reported status to assign a primary node in the distributed firewall cluster. Reported primary node status includes reported primary node eligibility if the node is a member of a preexisting cluster, reported primary node status comprising reporting primary node ineligibility if the node is not a member of a preexisting cluster, reported primary node status if the node is a primary node in a preexisting cluster, and reported primary node eligibility in a node that has timed out

DETAILED DESCRIPTION

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

Figure 1:
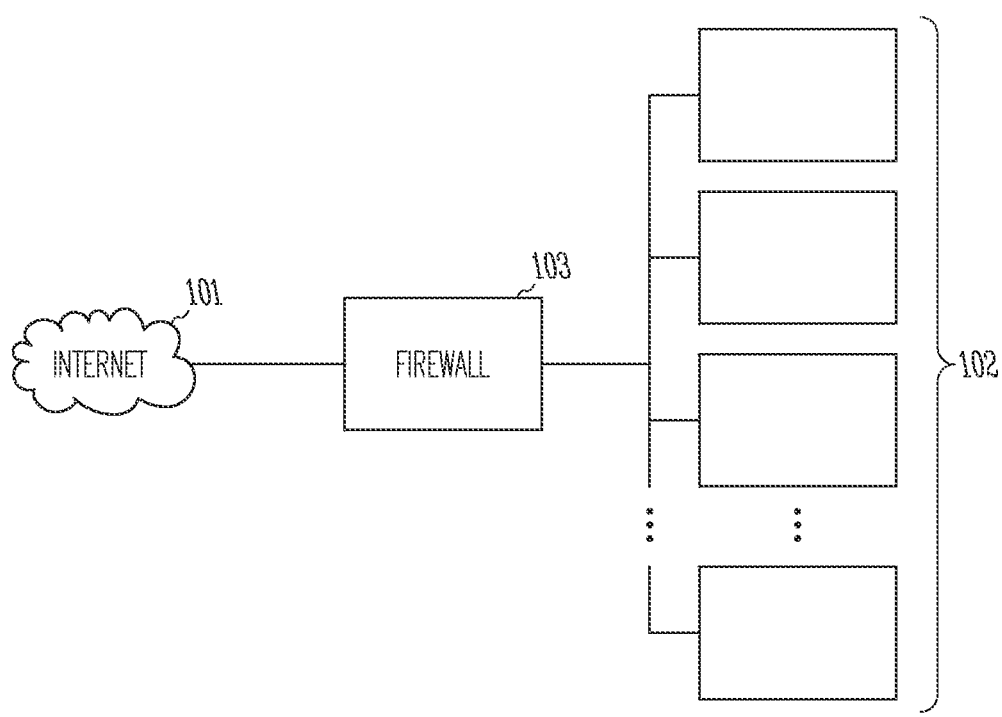
FIG. 1 shows an example network including a firewall, as may be used to practice some embodiments of the invention.

FIG. 1 illustrates atypical computer network environment, including a public network such as the Internet at 101, a private network 102, and a computer network device operable to provide firewall and intrusion protection functions shown at 103. In this particular example, the computer network device 103 is positioned between the Internet and the private network, and regulates the flow of traffic between the private network and the public network.

The network device 103 is in various embodiments a firewall device, and intrusion protection device, or functions as both. A firewall device or module within the network device provides various network flow control functions, such as inspecting network packets and dropping or rejecting network packets that meet a set of firewall filtering rules. As described previously, firewalls typically perform their filtering functions by observing communication packets, such as TCP/IP or other network protocol packets, and examining characteristics such as the source and destination network addresses, what ports are being used, and the state or history of the connection. Some firewalls also examine packets to determine what application has established the connection, or act as a proxy device by processing and forwarding selected network requests between a protected user and external networked computers. Firewalls often use "signatures" or other characteristics of undesired traffic to detect and block traffic that is deemed harmful or that is otherwise undesired.

Firewalls typically use sets of rules to filter traffic, such that what happens with any particular element of network data is dependent on how the rule set applies to that particular data. For example a rule blocking all traffic to port 6346 will block incoming traffic bound for that port on a server within the protected network, but will not block other data going to the same server on a different port number. Similarly, a rule blocking traffic originating from a file sharing program such as Shareaza will use patterns in the traffic to block Shareaza traffic on port 6346, but allow other traffic on port 6346.

But, in an environment where a firewall is implemented as a system distributed across multiple computers or nodes, such as in a large or complex system, the ability of multiple nodes to share a connection is limited by each node's information regarding the connection, such as socket information, application information, user information, and the like regarding the connection. Some embodiments of the invention therefore share information, such as information regarding rule sets, connections currently being processed, and other information among the various node sin the network. The nodes in a further example are configured such that one node takes a primary or master role, and manages the function of other nodes available to the cluster.

Figure 2:
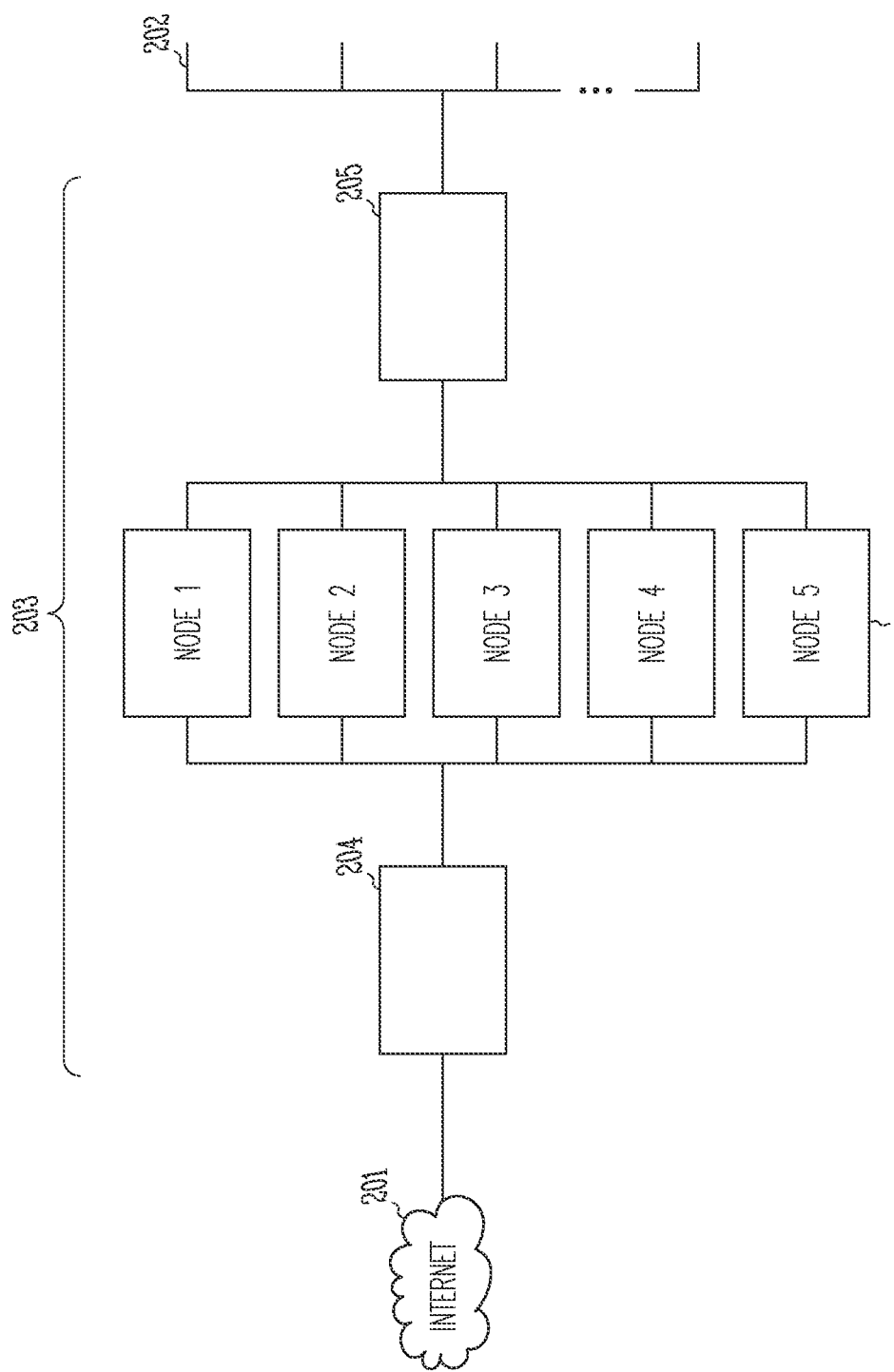
FIG. 2 shows an example network including a firewall cluster comprising multiple firewall nodes, consistent with an example embodiment of the invention.

In one such example, a firewall or intrusion protection system is implemented as a cluster or connected group of nodes that share processing traffic flowing through the firewall. FIG. 2 shows a network with a distributed firewall, as may be used to practice some embodiments of the invention. Here, a network such as the Internet 201 is coupled to an internal network 202 by a firewall, 203. The firewall 203 comprises an incoming traffic module 204 and an outgoing traffic module 205 that can perform functions such as load balancing and other firewall management functions. The firewall or intrusion protection rules are applied in firewall nodes 206, which are connected to one another by network connections as shown.

Here the five nodes shown each comprise a separate computer system running an instance of firewall or related software, operable to apply rules to traffic to selectively permit or block traffic flowing between the Internet 201 and the internal network 202. In an alternate embodiment, some nodes such as nodes 1, 2, and 3 execute a firewall application, while other nodes such as 4 and 5 execute an intrusion protection system (IPS) application. The nodes 204 and 205 are responsible for performing functions such as load balancing traffic routed to the firewall nodes 206, ensuring that the nodes are able to work together efficiently to provide higher throughput capability than a single node.

In a distributed firewall system such as this, determining what node is a master or coordinating node and what nodes are available to be added to a cluster can be a somewhat complex configuration task. One option is to manually explicitly set each node to perform a certain role in the cluster, but such a configuration has disadvantages such as the labor required and inability to recover if the designated primary node fails or does not boot properly.

Some distributed firewall embodiments therefore provide management of timing and coordination issues when establishing a distributed firewall cluster, enabling a cluster to self-configure into a working distributed firewall upon startup.

In a more detailed example, a crossbeam linking the various nodes to one another provides various management functions, such as coordination of a designated primary node in the cluster. Referring again to FIG. 2, some nodes such as nodes 206 are firewall nodes, and run instances of the distributed firewall. Other nodes, such as nodes 204 and 205 perform functions such as providing external network ports, toad balancing, etc. Additional nodes (such as additional nodes 206) in a further embodiment provide control functions, file server, and other configuration/resource functionality to form a crossbeam architecture supporting the distributed firewall system.

The crossbeam control nodes here monitor the nodes available to the system, and signal the node designated as the primary node so that the signaled node operates as the primary node rather than a secondary node. The designated primary node then creates a cluster, while other nodes are informed which node is the primary node and register with the primary node as they become operational to join the cluster.

Such a configuration works well when all nodes are operational, but if the primary node fails to boot, the crossbeam can be unaware and unable to recover in some instances. Further, if the crossbeam nominates a new master node on reboot of the distributed firewall system, the old nodes that were part of the distributed firewall will still attempt to contact the old primary node and will not join the new cluster.

Some embodiments of the invention therefore include features enabling a distributed firewall cluster to better manage nodes trying to form a cluster, such as eligible nodes notifying the crossbeam system when such a node is up and is available to be designated as a primary node. The crossbeam system can therefore manage designation of a primary node, preventing problems such as split clusters and no clusters from forming.

Split clusters can form when a system reboots and has a change in configuration, such as when a node is added to increase performance or a replacement node is added to a system. For example, consider a booting system in which the crossbeam starts the nodes in an order, and designates the new node as the primary node. The new node recognizes that it is not in an existing cluster and reports to the crossbeam that it is not therefore eligible to be a primary node. This prevents the new node from forming its own cluster. The other two nodes then start up and report they are eligible to be the primary node, as they have knowledge of the previous firewall cluster.

The crossbeam system can therefore change the primary node to one of the two nodes reporting eligible, sending notice of the primary node designation to the other node in the previous cluster on that it knows it's a secondary node and knows the identity of the primary node.

The new node also receives notice that it's a secondary node from the crossbeam, and receives knowledge of the designated primary node that is used to connect to the primary node and join the cluster. In a more detailed example, the knowledge of the primary node sent to the new node includes an IP address of the primary node, and a password or other such credential enabling the node to associate itself with the primary node.

In another example, a new cluster is booted for the first time, and no existing cluster information is therefore stored on any nodes in the distributed firewall. In this case, all nodes will boot and report that they are ineligible to be the primary node, and the system will essentially stall with no designated primary node. The nodes in this example are therefore further configured to start reporting that they are primary eligible if they have been booted for a certain period of time (such as five minutes, 10 minutes, or any other suitable period) without receiving notice from the crossbeam that a node has been designated as the primary node. One of the nodes can then be assigned as the primary node, and the other new nodes can be notified of the primary node's identity as before, using an IP address and password to join the cluster by contacting the primary node.

If a node is told to be a primary node and form a cluster, such as by being configured as the primary in the crossbeam system before it times out and reports itself as primary eligible, the designated node ensures that its status is "primary eligible". This prevents other nodes from timing out and claiming primary eligible status, forming a split cluster in the event of a long boot sequence or timeout. Once the designated primary node is booted and operational, it reports that it is the primary node rather than primary eligible.

Figure 3:
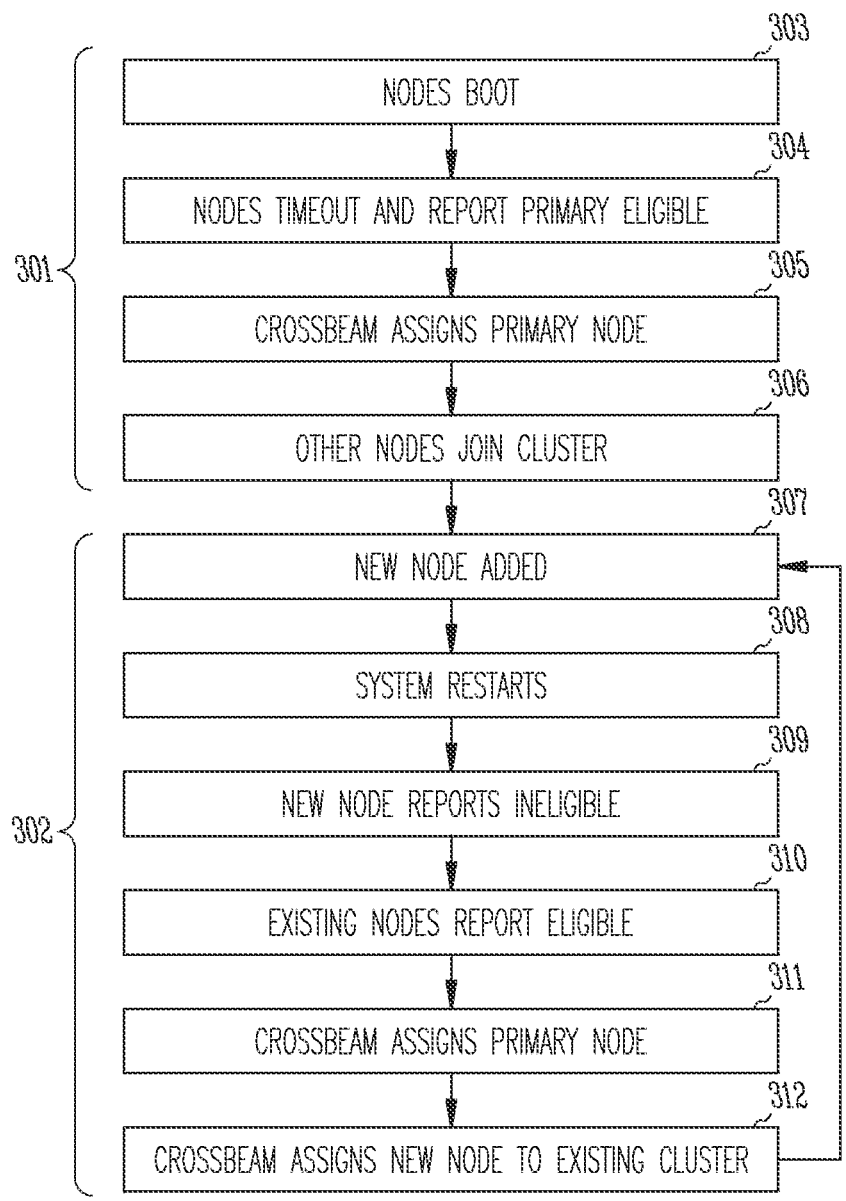
FIG. 3 is a flowchart illustrating a typical configuration cycle of a distributed firewall cluster, consistent with an example embodiment of the invention.

FIG. 3 illustrates a typical configuration cycle of a distributed firewall, consistent with an example embodiment of the invention. The flowchart is divided into two parts initial formation of a distributed firewall cluster at 301, and addition of a new node at 302.

At 303, a new distributed firewall system boots for the first time, and the nodes all report ineligible to serve as the primary node as they have no knowledge of membership in an existing cluster. At 304, the nodes reach timeout, and begin to report themselves eligible to be the primary node. The crossbeam system assigns one of the nodes as the primary node at 305, and sends information regarding the primary node to the other nodes. The other nodes join the cluster at 306, and the cluster is operational.

At 307, the distributed firewall system is upgraded by adding one or more additional nodes to the cluster. To add the new node, the system is shut down and the new node hardware is installed at 307. The system is restarted at 308, and the new node boots and reports ineligible to be a primary node at 309, as it has no knowledge of being a part of an existing cluster. The other nodes in the network report eligible to be the primary node at 310, as they were previously part of the cluster, and optionally one of the nodes reports back as the primary node. The crossbeam system assigns a primary node at 311 if needed, such as where no existing node has reported primary but the nodes have reported eligible to be the primary node, such as where a failed primary node is being replaced. Once the cluster is started and a primary node has been identified, the crossbeam notifies the new node to the existing cluster's primary node, and provides primary node information including primary node IP address and security credentials to join the cluster at 312.

These examples illustrate how management of nodes in a cluster, including management of a primary node, can be employed to prevent a variety of timing and other problems in configuration of a distributed firewall cluster. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the example embodiments of the invention described herein. It is intended that this invention be limited only by the claims, and the full scope of equivalents thereof.

The invention claimed is:

1. A non-transitory computer readable medium comprising computer executable instructions stored thereon that when executed cause one or more processing units to:
   initialize a firewall cluster comprising three or more firewall processing nodes, each node comprising a hardware network device operable to selectively permit or block traffic flowing between the firewall cluster and an external network;
   receive a report from each node of the firewall cluster that the node is ineligible to be a primary node;
   receive a report from one or more nodes of the firewall cluster that the node is eligible to be a primary node after a predetermined time period;
   prevent formation of a split cluster by designating one of the eligible nodes as a primary node; and
   notify the remaining nodes of the firewall cluster about the designated primary node.

2. The computer readable medium of claim 1 further comprising instructions that when executed cause the one or more processing units to:
   execute, by one or more nodes of the firewall cluster, a firewall application.

3. The computer readable medium of claim 1 further comprising instructions that when executed cause the one or more processing units to:
   execute, by one or more nodes of the firewall cluster, an intrusion protection application.

4. A firewall system, comprising:
   three or more firewall processing nodes interconnected by a network, each processing node comprising a hardware network device operable to execute rules to selectively filter traffic between the firewall processing nodes and an external network; and
   a hardware controller operable to execute instructions that when executed cause the hardware controller to:
      receive a report from each node of the firewall processing nodes that the node is ineligible for designation as a primary node;
      receive a report from each node of the firewall processing nodes that the node is eligible for primary node designation before expiration of a predetermined time period;
      prevent formation of a split firewall cluster by assigning one of the eligible nodes as a primary node before expiration of the predetermined time period;
      receive a report from each remaining node of the firewall processing nodes that the node is eligible for primary node designation upon expiration of the predetermined time period; and
      notify the remaining nodes of the firewall processing nodes about the assigned primary node to form a firewall cluster.

5. The firewall system of claim 4, wherein the rules to selectively filter traffic between the firewall processing nodes and an external network are executed by a plurality of nodes of the firewall processing nodes.

6. The firewall system of claim 4, wherein the hardware controller is further operable to execute instructions that when executed cause the hardware controller to:
select one or more nodes of the firewall processing nodes; and
execute a firewall application on the selected nodes.

7. The firewall system of claim 4, wherein the hardware controller is further operable to execute instructions that when executed cause the hardware controller to:
select one or more nodes of the firewall processing nodes; and
execute an intrusion protection application on the selected nodes.

8. A distributed firewall cluster comprising:
three or more firewall processing nodes interconnected by a network and connected to an external network, each firewall processing node comprising:
a network device operable to selectively filter traffic between the firewall processing node and the external network and to send primary node eligibility information; and
a hardware controller operable to monitor available firewall processing nodes, the hardware controller adapted to execute instructions that when executed cause the hardware controller to:
initialize a firewall cluster, the firewall cluster comprising three or more firewall processing nodes;
receive an ineligibility notification from each firewall processing node that the node is ineligible for designation as a primary node;
receive an eligibility notification from a plurality of firewall processing nodes that the node is eligible for primary node designation, the eligibility notification received after a predetermined time period;
prevent formation of a split firewall cluster by designating an eligible node as a primary node; and
notify the remaining nodes of the firewall processing nodes about the designation of the primary node to form the firewall cluster.

9. The distributed firewall cluster of claim 8, wherein the hardware controller is adapted to execute instructions that when executed cause the hardware controller to:
selectively filter traffic between the external network and a plurality of firewall processing nodes comprising the firewall cluster.

10. The distributed firewall cluster of claim 9, wherein the instructions to selectively filter traffic between the cluster and the external network are stored on a plurality of nodes.

11. The distributed firewall cluster of claim 8 further comprising:
The hardware controller operable to execute instructions that when executed cause the hardware controller to:
select one or more nodes of the firewall cluster; and
execute a firewall application on the selected nodes.

12. The distributed firewall cluster of claim 8 further comprising:
The hardware controller operable to execute instructions that when executed cause the hardware controller to:
select one or more nodes of the firewall cluster; and
execute an intrusion protection application on the selected nodes.

13. A system comprising:
three or more nodes interconnected by a network, each node comprising a computer system adapted to share processing of at least one of a firewall application and an intrusion protection application; and
a hardware controller operable to monitor nodes available to the system, the hardware controller adapted to execute instructions that when executed cause the hardware controller to:
initialize a firewall cluster, the firewall cluster comprising one or more nodes that comprise members of a previous firewall cluster and a new node;
assign the new node as a primary node;
receive a report from the assigned primary node that the assigned primary node is ineligible to be a primary node to prevent formation of a split firewall cluster;
receive a report from each node comprising a member of the previous firewall cluster that the node that was a member of the previous firewall cluster is eligible to be a primary node;
designate one of the eligible nodes as the primary node;
designate the assigned primary node as a secondary node; and
designate any remaining nodes comprising a member of the previous firewall cluster as a secondary node and notify all secondary nodes about the primary node to form the firewall cluster.

14. The system of claim 13 further comprising:
a node adapted to execute instructions that when executed cause the node to:
determine its membership in the previous firewall cluster;
determine its eligibility to be a primary node based on its membership to the previous firewall cluster; and
send a report to the hardware controller that indicates whether the node is eligible or ineligible to be a primary node.

15. The system of claim 14 further comprising:
wherein if the node determines that it is not a member of the previous firewall cluster, the node sends a report to the hardware controller that indicates the node is ineligible to be a primary node.

16. The system of claim 14 further comprising:
wherein if the node determines that it is a member of the previous firewall cluster, the node sends a report to the hardware controller that indicates the node is eligible to be a primary node.

17. The system of claim 13 further comprising:
the hardware controller adapted to execute instructions that when executed cause the hardware controller to:
selectively filter traffic between the firewall cluster and an external network.

18. The system of claim 17, wherein the instructions to selectively filter traffic between the firewall cluster and the external network are stored on a plurality of nodes of the firewall cluster.

19. The system of claim 13, wherein the hardware controller comprises one or more control nodes, the control nodes operable to execute instructions that when executed cause the control nodes to:
select one or more nodes of the firewall cluster; and
execute a firewall application on the selected one or more nodes.

20. The system of claim 13, wherein the hardware controller comprises one or more control nodes, the control nodes operable to execute instructions that when executed cause the control nodes to:
select one or more nodes of the firewall cluster; and
execute an intrusion protection application on the selected one or more nodes.

21. A method comprising:
monitoring, by a hardware control node, one or more nodes that comprise members of a previous firewall cluster and a new node, each node comprising a computer system adapted to share processing of at least a firewall application;
assigning, by the control node, the new node as a primary node;
receiving a report from the assigned primary node that the assigned primary node is ineligible to be a primary node;
receiving a report from one or more nodes comprising a member of the previous firewall cluster that the node is eligible to be a primary node;
designating one of the eligible nodes as the primary node;
designating the assigned primary node as a secondary node; and
designating any remaining nodes of the previous firewall cluster as a secondary node and notifying all secondary nodes about the primary node to form a new firewall cluster.

22. The method of claim 21, wherein the report from the assigned primary node that the assigned primary node is ineligible to be a primary node prevents formation of a split firewall cluster.

23. The method of claim 21 further comprising:
determining, by one or more nodes, its membership to the previous firewall cluster;
determining, by one or more nodes, its eligibility to be a primary node based on its membership to the previous firewall cluster; and
sending, by one or more nodes, a report to the hardware control node that indicates whether the sending node is eligible or ineligible to be a primary node.

24. The method of claim 23 further comprising:
sending, by one or more nodes, a report to the hardware control node that indicates the sending node is ineligible to be a primary node responsive to determining that the one or more nodes is not a member of the previous firewall cluster.

25. The method of claim 23 further comprising:
sending, by one or more nodes, a report to the hardware control node that indicates the sending node is eligible to be a primary node responsive to determining that the one or more nodes is a member of the previous firewall cluster.

* * * * *